(12) United States Patent
Arafat

(10) Patent No.: US 11,085,119 B2
(45) Date of Patent: Aug. 10, 2021

(54) CORROSION PREVENTIVE COMPOSITIONS

(71) Applicant: El Sayed Arafat, Leonardtown, MD (US)

(72) Inventor: El Sayed Arafat, Leonardtown, MD (US)

(73) Assignee: The United States of America as represented by the Secratary of the Navy, Washington, DC (US)

(*) Notice: Subject to any disclaimer, the term of this patent is extended or adjusted under 35 U.S.C. 154(b) by 0 days.

(21) Appl. No.: 16/683,808

(22) Filed: Nov. 14, 2019

(65) Prior Publication Data
US 2021/0147985 A1 May 20, 2021

(51) Int. Cl.
C23F 11/16 (2006.01)
C23F 11/14 (2006.01)
C23F 11/08 (2006.01)
C23C 22/02 (2006.01)
C09D 5/08 (2006.01)
C10N 30/12 (2006.01)

(52) U.S. Cl.
CPC .......... C23F 11/16 (2013.01); C09D 5/08 (2013.01); C09D 5/084 (2013.01); C09D 5/086 (2013.01); C23C 22/02 (2013.01); C23F 11/08 (2013.01); C23F 11/141 (2013.01); C23F 11/163 (2013.01); C10M 2203/102 (2013.01); C10M 2203/106 (2013.01); C10M 2213/04 (2013.01); C10M 2215/06 (2013.01); C10M 2215/064 (2013.01); C10M 2219/044 (2013.01); C10M 2227/04 (2013.01); C10N 2030/12 (2013.01)

(58) Field of Classification Search
None
See application file for complete search history.

(56) References Cited

U.S. PATENT DOCUMENTS

| 5,958,850 | A | 9/1999 | Matsuzaki et al. |
| 7,776,233 | B2 | 8/2010 | Arafat |
| 1,020,826 | A1 | 2/2019 | Arafat |
| 2007/0096060 | A1 | 5/2007 | Arafat |
| 2011/0239971 | A1* | 10/2011 | Nelson ................ C10M 139/02 123/1 A |
| 2012/0217443 | A1* | 8/2012 | Shibata ............... C10M 171/02 252/395 |
| 2018/0371349 | A1* | 12/2018 | Arafat ................. C10M 133/12 |

OTHER PUBLICATIONS

Corrosion Preventive Compounds, Water Displacing Ultra-Thin Film, Jul. 18, 2018, MIL-PRF-81309H.

* cited by examiner

Primary Examiner — Katie L. Hammer
(74) Attorney, Agent, or Firm — Mark O. Glut; NAWCAD

(57) ABSTRACT

Invention relates to corrosion-inhibiting compositions and the process of using said compositions to protect metal from corrosion. The compositions comprise of sulfonates, a carboxylic-sulfonic acid metal complex, antioxidants, fluorinated copolymers, hydrophobic silanes and siloxane additives and solvent.

10 Claims, 1 Drawing Sheet

Neutral Salt Spray Test Results for the invention and commercial CPC Products

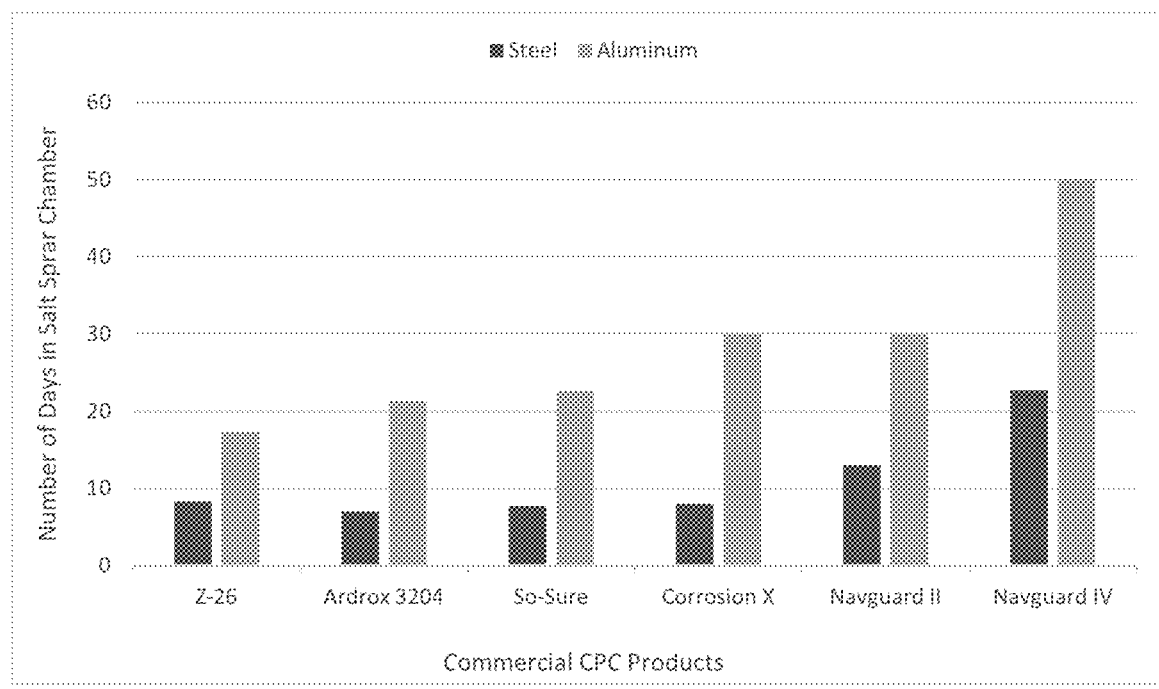
Fig. (1) Neutral Salt Spray Test Results for the invention and commercial CPC Products

CORROSION PREVENTIVE COMPOSITIONS

STATEMENT OF GOVERNMENT INTEREST

The Invention described herein may be manufactured and used by or for the Government of the United States of America for government purposes without the payment of any royalties thereon or therefore. The Defense Logistics Agency, Richmond, Va., is acknowledged for funding research for developing this invention.

FIELD OF THE INVENTION

This invention relates to corrosion-inhibiting compositions and to methods of using said compositions by spraying or brushing onto metal parts for long-term protection to minimize environmental effects particularly on aircraft parts. High performance, long lasting protection has been developed for use on internal airframe applications in the military to reduce the cost of corrosion maintenance and to improve the fleet's readiness. This invention is focused on optimizing a blend of corrosion inhibitors, solvents, oil, antiwear agents, antioxidants, detergents and additives to form high-performance corrosion inhibitors.

BACKGROUND

It is known that corrosion of metallic surfaces impact on the Department of Defense assets. As aircraft age, corrosion often occurs in internal structures which are not easily inspected or treated. Corrosion is difficult to detect and correct; therefore, corrosion prevention is usually the most cost-effective treatment. However, due to limited performance, traditional CPC's (Corrosion Preventative Compounds) require repeated applications during regular maintenance intervals. To address this problem, NAVAIR has developed an advanced corrosion-preventive composition to reduce the cost of maintenance of aircraft systems, and extend the life of aircraft platforms. This invention has exhibited superior corrosion resistance in laboratory testing and in the field test application on F-18 and P-8A aircraft. The invention (Navguard IV) has met the qualification requirements of MIL-PRF-81309H Type IV specification. The benefits of the invention are reducing the maintenance intervals for re-application of CPC's and reducing the amount of CPC's (Corrosion Preventive Composition) used. NAVAIR is in the process of updating NAVAIR 01-1A-509 manual to incorporate Type IV product to make it available for Department of Defense services.

SUMMARY

As aircraft age, corrosion often occurs in the internal structures which are not easily inspected or treated. Preventing corrosion of metals in aircraft is a critical priority for the military, especially in harsh environments where humidity, salt, and heat can reduce metal parts to piles of dust. This effort investigated the advantage of incorporating hydrophobic film ingredients such as the organosilanes and fluorinated carbon chemicals into corrosion preventive formulations. More important, the invention has been updated to incorporate a newly developed corrosion-preventive compound known as Navguard IV. The Defense Logistics Agency (DLA) has issued several National Stock Numbers (NSNs) for Navguard IV to make it available to Department of Defense services. A field test for the Navguard IV product was conducted on F-18 and P-8A aircraft at three DOD testing sites. The first field-test for Navguard IV was conducted on the platform at the Naval Air Station. The second field-test was conducted on F-18 aircraft at a Naval Air Station. The third field-test was conducted on P-8A aircraft at a Fleet Readiness Center South East (FRC SE), Jacksonvile, Fla. The duration of the field test at both locations lasted for 12 months and has shown no sign of corrosion on any of the platforms used in the study. The application of the newly developed anticorrosion composition is expected to increase fleet readiness and provide a significant cost savings to the end user.

DETAIL OF INVENTION

A purpose of the invention was to investigate the advantage of incorporating hydrophobic film ingredients such as organosilanes and fluorinated carbon chemicals into a corrosion preventive formulation. Siloxanes and silanes (e.g. alkoxysilanes) are known as a class of chemicals used for hydrophobic coatings and water repellants. The function of this type of coating is based on improved film adhesion with metal surfaces and hydrophobing properties. The Polyfluorinated ethylenes, propylenes, and polytetrafluoroethylenes are examples of fluorinated-carbon chemicals that are used in hydrophobic coatings.

To evaluate the improved performance of this invention, we conducted the neutral salt spray test (ASTM B117) on the compositions compared to the commercial CPC products. The selected commercial CPC products are currently qualified for the requirements of MIL-PRF-81309H TYPE II specification (Table 1). The salt spray test results on 1020 steel and 2024 aluminum panels for both the invention and the commercial products as shown in Table 1 and FIG. 1.

TABLE (1)

Neutral Salt Spray Test for the new invention and commercial CPC products

| Product | Manufacturer | 2024 Aluminum (Daye's) | 1020 Steel (Daye's) |
|---|---|---|---|
| Z-26 | Zip-Chem | 17.3 | 8.3 |
| Ardrox 3204 | Chemetall | 21.3 | 7 |
| So-Sure | Lighthouse for the Blind | 22.6 | 7.7 |
| Corrosion X | Corrosion Technologies | 28 | 8 |
| Navguard II | Corrosion Technologies | 30 | 13 |
| New CPC Invention | NAVAIR | 50 | 22.7 |

Navguard Formulations

| | WEIGHT (Gram) | Percentage (%) |
|---|---|---|
| 1. NA-Sul CA/W121 (Calcium Alkylnaphthalenesulfnates) | 16.0 g (14 to 20) | 16% |

-continued

| | | WEIGHT (Gram) | Percentage (%) |
|---|---|---|---|
| 2. | NA-Sul CA-HT3 (Corrosion Inhibitor) (Calcium Dinonylnaphthalenesulfonate Carboxylate) | 12.0 g (8 to 16) | 12% |
| 3. | AO-130 (Antioxidant) (Nonylated Diphenylamine) | 0.5 g (0.1 to 1.0) | 0.5% |
| 4. | KX 1048 (Antioxidant) (Arylamine) | 0.2 g (0.1 to 0.4) | 0.2% |
| 5. | Isopar L. solvent (Paraffinic Hydrocarbon) | 27.0 g (25-30) | 27% |
| 6. | Cross Oil L-200 (Naphthenic oil) | 42.1 g (40-44) | 42.1% |
| 7. | FluorN S83 (Fluorinated copolymers) Surfactant, Cytonix | 2.0 g (1.0 to 4.0) | 2% |
| 8. | BYK-Silclean 3720 Hydrophobic additive (Organic Silanes) (and siloxanes) | 0.2 g (0.1 to 0.4) | 0.2% |
| | | 100.0 g | 100% |

Fluoroacrylate copolymers are the reaction product of a fluorochemical alcohol, at least one unbranched symmetric diisocyanate, and at least one hydroxy-terminated alkyl (meth)acrylate or 2-fluoroacrylate monomer. Fluorinated alkoxy and alkylene compounds e.g. polytetrafluorethylene are examples.

A variety of organic solvents are used for purposes of this invention. The preferred solvents are substantially non-polar or oleophilic solvents. These preferred solvents include solvents comprising aromatic or aliphatic hydrocarbons. Aromatic solvents include benzene, toluene, xylenes, and fractions from distillation of petroleum. Aliphatic hydrocarbon solvents include hexane, cyclohexane, heptanes, octanes, and similar straight and branched hydrocarbons and mixtures thereof, generally having 4-16 carbon atoms. Included are the aliphatic fractions from the distillation of petroleum including mineral spirits and various mixtures of these solvents in any ratio. Commercial solvents (paraffinic hydrocarbons) are available from Exxon Mobil under the product name ISOPAR.

The specific corrosion inhibitor is derived from the reaction of at least one sulfonic acid such as petroleum sulfonic acid and at least one carboxylic acid with a metal compound to form the complex. The corrosion inhibitor is derived from the stoichiometric reaction of a metal compound such as an alkaline earth metal with a sulfonic acid e.g. petroleum sulfonic acid and a carboxylic acid preferably at least one or more of the fatty acids to form the metal complex of the acids. For example, the sulfonic acids can have the formula $R^1(SO_3H)_3$ or $(R^2)_xR(SO_3H)_y$. The $R^2$ is a hydrocarbon radical containing from 4-30 aliphatic carbon atoms, preferably aliphatic hydrocarbons such as alkyl or alkenyl. $R^2$ can have substituents or interrupting groups as those set forth above, provided the hydrocarbon character is retained. The radical R can be a cyclic group derived from an aromatic hydrocarbon including benzene, naphthalene, biphenyls, or a heterocyclic group. The subscripts x and y have a value of 1 and can have a value ranging from 1-3.

Specific examples of the sulfonic acids include mahogany sulfonic acids, petroleum sulfonic acids, polywax-substituted naphthalene sulfonic acids, cetylphenol sulfonic acids, cetoxycapryl aryl sulfonic acids, licapryl nitronaphthalene sulfonic acids, paraffin wax sulfonic acids, hydroxyl-substituted wax sulfonic acids, tetra-amylene sulfonic acids, petroleum naphthene sulfonic acids, cetylcyclopentyl sulfonic acids, lauryl cyclohexyl sulfonic acids, mono- and polywax-substituted sulfonic acids, dodecylbenzene sulfonic acids and the like.

The carboxylic acids used in preparing the metal sulfonic and carboxylic acid complexes include aliphatic and aromatic mono and poly carboxylic acids such as naphthenic acids, alkenyl-substituted cyclopentanoic acids, or the alkyl-substituted aromatic carboxylic acids. The aliphatic acids generally contain at least 6 and preferably at least 10 carbon atoms. The cycloaliphatic and aliphatic carboxylic acids can be saturated or unsaturated. Specific examples of the carboxylic acids include 2-ethylhexanoic acid, linolenic acid, substituted maleic acids, behenic acid, isostearic acid, pelargonic acid, capric acid, linoleic acid, lauric acid, oleic acid, ricinoleic acid, undecylic acid, myriatic acid, palmitic acid, acids formed by oxidation of petroleum or hydrocarbon waxes, and mixtures of two or more carboxylic acids and the like. The equivalent weight of these carboxylic acids is the molecular weight divided by the number of acid groups. Effective amounts of a hydrocarbon wax such as paraffin, petroleum and olefin waxes can be added to the corrosion-inhibiting composition to improve the application of the corrosion inhibiting compositions.

Preferably, the sulfonate-carboxylate metal complexes are derived from alkaline earth metals compound such as calcium, barium or magnesium compounds. These metal neutralizing compounds include the metal oxides, hydroxides, carbonates and mixtures thereof. These corrosion-resistant metal complexes are derived from the reaction of these metal compounds with stoichiometric amounts of the sulfonic acids and the carboxylic acids to form the metal complex. Commercial sulfonate-carboxylate complexes are available from King Industries under the mark NA-SUL®. The oil soluble organophosphates e.g. alkyl phosphates are derived from phosphorous and phosphoric acids forming the phosphoric acid mono- and diesters including the metal, ammonium or amine salts of these acids.

Antioxidants are added to the corrosion-resistant compositions of this invention in amounts ranging from about 0.2 to 1.0 parts by weight and preferably about 0.7. The preferred antioxidants are selected from the group consisting of the diphenylamines and derivatives there, alkylated diphenyl-amines, e.g. the $C_1$-$C_{10}$ alkylated phenylated amines, and phenylnapthylamines and the like.

In coating aircraft frames and the like, a solid "hot melt" composition is particularly suitable. For corrosion-inhibiting purposes, however, the thickened composition of this invention may be applied to a metal surface such as aluminum by methods including brushing, spraying, dip-coating, flow-coating, roller-coating and the like. The viscosity of a thickened composition may be adjusted for the particular method of application by adding an inert organic solvent. The coated metal surface may be dried by exposure to air or baking. If the coating composition is of correct viscosity, the coating or film can be applied directly to the metal surface and the solvent and drying may not be necessary. The film thickness is not critical, however, and a coating ranging up to about 5,000 mg. or more per square foot for coatings of aircraft frames or other structural members is sufficient to provide adequate protection.

While this invention has been described by a number of specific examples, it is obvious to one skilled in the art that there are other variations and modifications which can be made without departing from the spirit and scope of the invention as particularly set forth in the appended claims.

The invention claimed is:

1. Corrosion-inhibiting compositions for protecting metal consisting essentially of, in parts by weight in grams, from about 14 to 20 parts of a metal sulfonate, 8.0 to 16 parts of corrosion inhibitor consisting of metal sulfonate-carboxylates, 0.1 to 1.0 parts of alkyl aryl amines, 0.1 to 0.4 parts of an aryl amine, 25 to 30 parts of paraffinic hydrocarbon solvent, 40 to 44 parts of naphthenic oil, 1.0 to 4.0 parts of a fluorinated copolymer, and 0.1 to 0.4 parts of at least one hydrophobic compound selected from the group consisting of organic silanes and organic siloxanes.

2. The corrosion-inhibiting composition of claim 1, wherein the metal sulfonate is 16 parts, the metal sulfonate carboxylate is 12 parts, the alkyl aryl amine is 0.5 parts, the aryl amine is 0.2 parts, the paraffinic hydrocarbon solvent is 27 parts, the naphthenic oil is 42.1 parts, the fluorinated copolymer is 2.0 parts and 0.2 parts of a hydrophobic compound selected from the group consisting of organic silanes and organic siloxanes.

3. The corrosion-inhibiting composition of claim 2, wherein the metal sulfonate is a metal alkylarysulfonate, the metal sulfonate-carboxylate is an arylalkyl sulfonatecarboxylate, the alkyl aryl amines are antioxidants, the solvent is a paraffinic hydrocarbon, the copolymer is fluoroacrylate copolymer, and the hydrophobic compound is an organic silane.

4. The corrosion-inhibiting composition of claim 2, wherein the hydrophophic compound is an organic siloxane.

5. The corrosion-inhibiting composition of claim 1, wherein the metal being protected is aluminum.

6. The corrosion-inhibiting composition of claim 1, wherein the metal of the sulfonates and carboxylates is selected from Group II of the Periodic Table.

7. Process for inhibiting corrosion of metal which comprises coating the metal with an effective amount of the corrosion-inhibiting composition of claim 1 wherein the metal sulfonate is 16 parts, the metal sulfonate-carboxylate is 12 parts, the alkyl aryl amine is 0.5 parts, the aryl amine is 0.2 parts, the hydrocarbon solvent is 27 parts, the naphthenic oil is 42.1 parts, the fluorinated copolymer is 2.0 parts and the hydrophobic compound is 0.2 parts of a compound selected from the group consisting of organic silanes and organic siloxanes.

8. The process of claim 7, wherein the metal being coated is aluminum.

9. The process of claim 7, wherein the hydrophobic compound is organic siloxane.

10. The process of claim 7 wherein the hydrophobic compound is organic silane.

* * * * *